(12) United States Patent
Tan

(10) Patent No.: US 7,380,070 B2
(45) Date of Patent: May 27, 2008

(54) ORGANIZATION OF DIRTY BITS FOR A WRITE-BACK CACHE

(75) Inventor: Teik-Chung Tan, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 187 days.

(21) Appl. No.: 11/060,141

(22) Filed: Feb. 17, 2005

(65) Prior Publication Data

US 2006/0184745 A1    Aug. 17, 2006

(51) Int. Cl.
*G06F 12/12* (2006.01)

(52) U.S. Cl. ...................................... 711/144

(58) Field of Classification Search ................ 711/135, 711/144
See application file for complete search history.

(56) References Cited

U.S. PATENT DOCUMENTS

| | | | |
|---|---|---|---|
| 4,742,454 A | | 5/1988 | Robinson et al. |
| 5,155,824 A | * | 10/1992 | Edenfield et al. ............ 711/143 |
| 5,692,150 A | * | 11/1997 | Moriyama et al. .......... 711/135 |
| 5,692,152 A | | 11/1997 | Cohen et al. |
| 5,778,431 A | * | 7/1998 | Rahman et al. ............. 711/135 |
| 5,784,590 A | | 7/1998 | Cohen et al. |
| 5,802,572 A | * | 9/1998 | Patel et al. .................. 711/143 |
| 5,890,217 A | * | 3/1999 | Kabemoto et al. .......... 711/141 |
| 5,900,011 A | | 5/1999 | Saulsbury et al. |
| 6,038,674 A | * | 3/2000 | Sasaki et al. ................ 713/500 |
| 6,128,702 A | | 10/2000 | Saulsbury et al. |
| 6,205,521 B1 | * | 3/2001 | Schumann ................... 711/144 |
| 6,401,173 B1 | * | 6/2002 | Razdan et al. .............. 711/141 |
| 6,728,838 B2 | * | 4/2004 | Chauvel et al. ............. 711/135 |
| 6,785,763 B2 | * | 8/2004 | Garnett et al. ................. 711/6 |
| 6,848,035 B2 | * | 1/2005 | Akiyama et al. ............ 711/156 |
| 2002/0078268 A1 | * | 6/2002 | Lasserre ........................ 710/22 |
| 2004/0225829 A1 | * | 11/2004 | Akiyama et al. ........... 711/104 |
| 2006/0085600 A1 | * | 4/2006 | Miyashita et al. ........... 711/128 |

FOREIGN PATENT DOCUMENTS

| | | |
|---|---|---|
| EP | 1 182 563 A1 | 2/2002 |
| EP | 1 298 532 A2 | 4/2003 |

OTHER PUBLICATIONS

"Selective Write Back Cache Replacement Strategy", IBM Technical Disclosure Bulletin, IBM Corp., New York, US, vol. 37, No. 6A, Jun. 1, 1994, pp. 199-200, XP000455742, ISN: 0018-8689.

* cited by examiner

*Primary Examiner*—Kevin L. Ellis
(74) *Attorney, Agent, or Firm*—Ronald O. Neerings; Wade J. Brady, III; Frederick J. Telecky, Jr.

(57) ABSTRACT

A cache system is constructed in accordance with an architecture that comprises a tag array into which tags are stored that are used to determine whether a hit or a miss into the cache system has occurred. Further, the cache system comprises a data array into which cache lines of data are stored, each cache line comprising a plurality of sub-lines, and each sub-line is adapted to be written back to a system memory separate from the other sub-lines. The cache system also comprises a controller coupled to the tag and data arrays. The tag array includes a cache-line dirty bit associated with each cache line and the data array includes a plurality of dirty bits for each cache line. The plurality of dirty bits comprises one sub-line dirty bit for each sub-line.

19 Claims, 2 Drawing Sheets

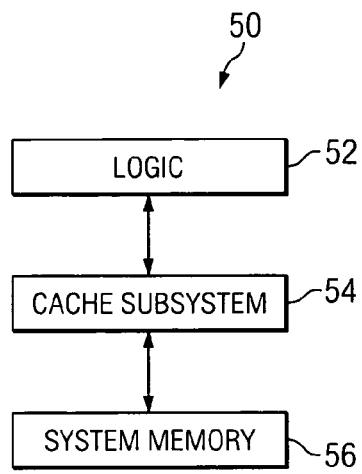
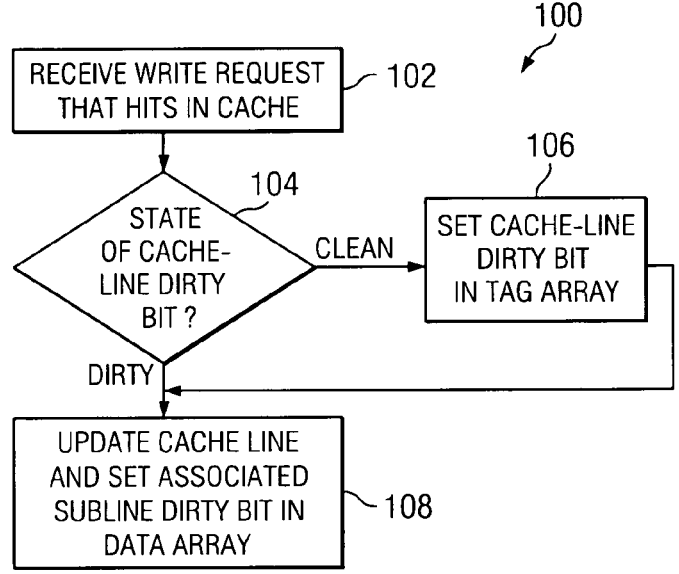
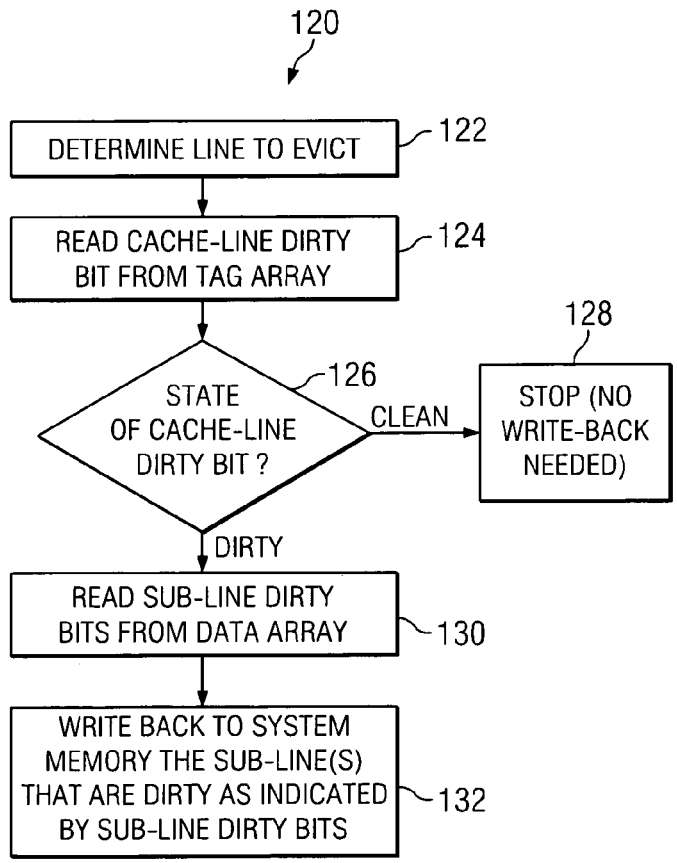
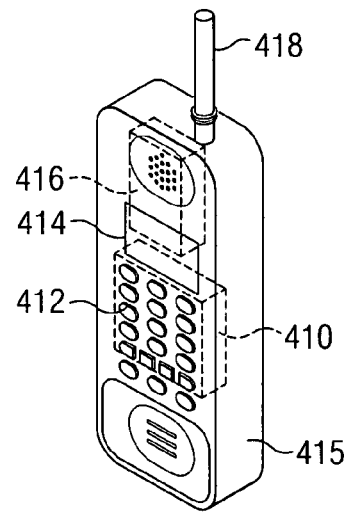

ORGANIZATION OF DIRTY BITS FOR A WRITE-BACK CACHE

BACKGROUND

On-chip caches are used in various microprocessor designs to improve performance by storing frequently used information in fast on-chip memories. The performance is improved because information can be retrieved quickly during program execution. Various types of cache architectures exist. A "write-back" cache, for example, allows modification of data to be carried out in the cache without immediately writing to the main memory reflect the same data modification. The memory is updated only when the data is eventually evicted from the cache, for example, to make room for new data in the cache. The write-back cache generally reduces bus traffic to main memory and generally delivers better performance and consumes less power than various other types of cache architectures. Reducing power consumption is particular beneficial in battery-operated devices such as cellular telephones.

In a write-back cache, the content of the cache may be more up-to-date than that of main system memory. The write-back cache maintains status bits to indicate whether the cache content has been modified. The status bits are referred to as "dirty" bits.

Caches are organized as a plurality of cache "lines" (also referred to as "blocks"). A cache line may comprise, for example, 64 bytes but the architectural size of a cache is determined by the cache architecture. Typically, there is one dirty bit per cache line. The dirty bit is set to a value of "1" when any byte within the cache line is modified. When the dirty bit is set to a 1, the entire cache line must be written back to the main memory when the data is eventually evicted from the cache, for example, to make room for new data. This architecture can be relatively inefficient in terms of both performance and power particularly as the cache line size becomes large because more data must be written back even though only a small number of bytes may have been modified. To overcome this problem, some write-back cache architectures partition the cache line into sub-lines. Each sub-line can be separately written back to system memory without having to write back the entire cache line.

A typical cache design consists of 3 functional blocks: the cache controller, the tag array, and the data array. To service a read request, the controller issues a read command to the tag array to look up the address to determine if there is a cache hit (i.e., whether the target data already resides in the cache). If there is a cache hit, the controller then issues a read command to the data array to retrieve the target data. If the request misses in the cache, the controller forwards the request to the next level of memory hierarchy (e.g. system memory) to read the cache line and load it into the cache. To make room in the cache for the new data, the controller must select a cache line in the cache for eviction. If the cache line being evicted has been modified (as indicated by a dirty bit that is set), the controller must write back the modified cache line (or sub-line) into the main memory. Otherwise, the controller simply overwrites the cache line with the new data.

To service a write request, the controller issues a read command to the tag array to look up the address to determine if there is a cache hit. If there is a cache hit, the controller issues a write command to the data array to update the data array with the new write data. When servicing a write request, the dirty bit is set to indicate that the cache data has been modified. Caches that implement sub-lines complicate the issue of how to implement and control dirty bits to track the state (clean or dirty) for each sub-line.

SUMMARY

Various embodiments are disclosed to address one or more of issues noted above. In one embodiment, a cache system is constructed in accordance with an architecture that comprises a tag array into which tags are stored that are used to determine whether a hit or a miss into the cache system has occurred. Further, the cache system comprises a data array into which cache lines of data are stored, each cache line comprising a plurality of sub-lines, and each sub-line is adapted to be written back to a system memory separate from the other sub-lines. The cache system also comprises a controller coupled to the tag and data arrays. The tag array includes a cache-line dirty bit associated with each cache line and the data array includes a plurality of dirty bits for each cache line. The plurality of dirty bits comprises one sub-line dirty bit for each sub-line. Such a cache system can be included in a processor that may be part of a larger system such as battery-operated communication device (e.g., a cellular telephone).

With such a cache architecture, an exemplary method of responding to a cache comprises, for a write request that hits into a particular cache line, determining whether the cache-line dirty bit in the tag array that is associated with that particular cache line indicates that the cache line is clean or dirty. The method further comprises, if the cache line is clean, setting the cache-line dirty bit to a dirty state to indicate that said particular cache line is dirty. Regardless of the state of the cache-line dirty bit, the method comprises setting one or more sub-line dirty bits in the data array to a dirty state to indicate which sub-lines are dirty as a result of the write request.

Upon eviction of a cache line, a method is also disclosed that comprises determining a state of the cache line using the cache-line dirty bit in the tag array. If the state of the cache line is clean, then no sub-line dirty bit in the data array need be read. If, however, the cache line is dirty, then the method comprises reading the sub-line dirty bits from the data array that are associated with the cache line to be evicted. These bits indicate which one or more sub-lines are to be written back to system memory.

These and other embodiments are disclosed herein.

BRIEF DESCRIPTION OF THE DRAWINGS

For a detailed description of exemplary embodiments of the invention, reference will now be made to the accompanying drawings in which:

FIG. 1 shows a system comprising a cache subsystem in accordance with a preferred embodiment of the invention;

FIG. 3 shows a method of controlling the dirty bits in the tag and data arrays of the cache subsystem;

FIG. 4 shows a method of evicting a cache line using the dirty bits in the tag and data arrays; and FIG. 5 shows an embodiment of the system in the form a battery-operated and communication device.

NOTATION AND NOMENCLATURE

Figure 2:
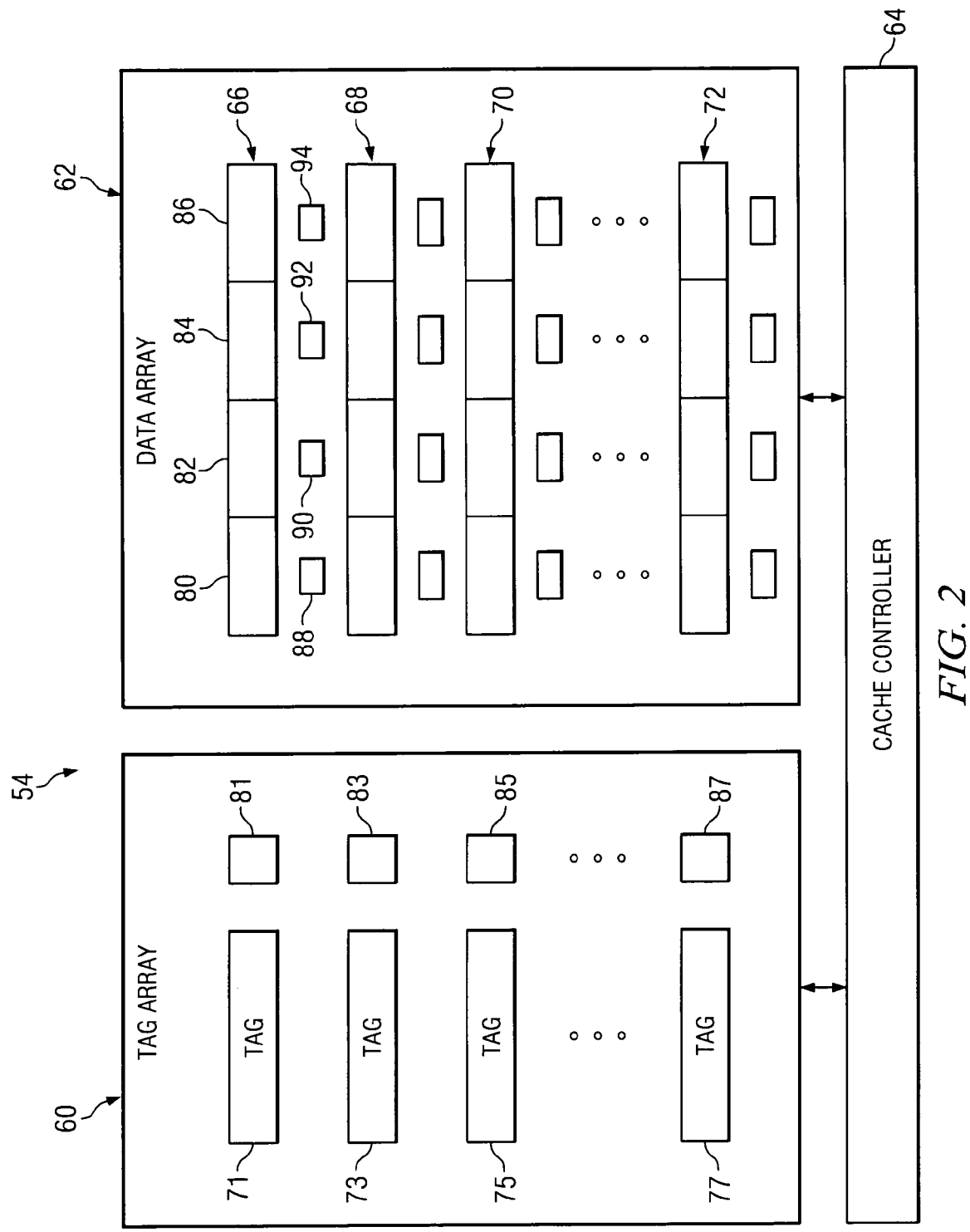
FIG. 2 shows a preferred embodiment of the cache subsystem.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers broadly to a collection of two or more components and may be used to refer to an overall system as well as a subsystem within the context of a larger system. This disclosure also refers to "data" being stored in a cache. In this context and unless otherwise specified, "data" can include data, instructions, or both.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 shows a preferred embodiment of a system 50 comprising a logic unit 52, a cache subsystem 54, and system memory 56. In some embodiments, the system 50 may comprise a processor. As a processor, logic unit 52 preferably comprises instruction fetch logic, instruction decode logic, instruction execution logic, and other types of functional logic as desired.

The cache subsystem 54 and system memory 56 form a memory hierarchy. When the logic unit 52 requires access to a memory location, either due to a read or write transaction, the logic unit 52 first ascertains whether the target data is located in the cache subsystem 54. If the target data is located in the cache subsystem 54, then the read or write transaction accesses the cache subsystem to complete the transaction. If, however, the target data is not located in the cache subsystem 54, then the logic unit 52 or the cache subsystem 54 accesses the system memory 56 to access the target data. The target data may then be copied into the cache subsystem 54 for future use. Numerous types of cache architectures are possible. The cache subsystem 54 may be unified (i.e., adapted to store both instructions and data) or non-unified (i.e., used to store instructions or data, but not both).

In at least some embodiments of the present invention, the cache subsystem 54 is implemented as "write-back" cache. As introduced above, a write-back cache comprises a data array organized as a plurality of cache lines in which data (instructions and/or data) is stored. As a write-back cache, a cache line that has been updated is not written back to system memory 56 until that particular line is evicted to make room for newer data or for other reasons (e.g., flush events). A cache line that has more updated data than what is in system memory is said to be "dirty" or in a "dirty state," while a cache line whose data is the same as that in system memory is said to be "clean" or in a "clean state."

FIG. 2 illustrates a preferred embodiment of the cache subsystem 54. As shown, the cache subsystem 54 comprises a tag array 60, a data array 62, and a cache controller 64 coupled to the tag and data arrays 60, 62. The data array 62 is organized as a plurality of cache lines 66, 68, 70, . . . ,72. In some embodiments, the data array may comprise multiple "ways," each way comprising multiple cache lines. Each cache line 66, 68, 70, 72 is used to store data. In accordance with the preferred embodiment, each cache line comprises a plurality of sub-lines. In the example of FIG. 2, each cache line comprises four sub-lines 80, 82, 84, and 86. The number of sub-lines per cache line can be varied from the example of FIG. 2 as desired.

Each cache line 66-72 maps to a tag 71, 73, 75, and 77 in the tag array. The tags contain information by which the cache controller can determine whether a hit or a miss has occurred in the cache subsystem 54. A hit occurs for a memory transaction when the target data of the transaction already resides in the data array. A miss occurs when the target data of the transaction already does not reside in the data array.

If a miss occurs and the data array 62 is already full, one or more cache lines 66-72 are evicted to make room for the data associated with the transaction that resulted in the miss. For certain types of cache (e.g., a write-back cache), the eviction process requires an evicted cache line that is dirty to be written back to system memory. Clean cache lines do not need to be written to system memory during the eviction process.

Dirty bits are used to keep track of the state (clean or dirty) of each cache line. In accordance with a preferred embodiment of the invention, each cache sub-line 80-86 has an associated sub-line dirty bit 88, 90, 92, and 94 as shown. Each sub-line dirty bit indicates the state of the associated sub-line. For example, sub-line dirty bit 88 indicates whether the sub-line 80 is clean or dirty, that is whether or not the data in the sub-line 68 is consistent with what is stored in system memory. Similarly, sub-line dirty bits 90, 92, and 94 reflect the state of their associated sub-lines 82, 84, and 86, respectively. By including a sub-line dirty bit for each sub-line, those sub-lines that are dirty can be identified and thus only dirty sub-lines need be written back to system memory during eviction.

In addition to the sub-line dirty bits in the data array as discussed above, the embodiment of FIG. 2 also shows a dirty bit 81, 83, 85, 87 in the tag array 60 associated with each cache line. Each of the dirty bits 81, 83, 85, 87 in the tag array indicate the state of the corresponding entire cache line. As such, dirty bits 81-87 are referred to as "cache-line dirty bits." Cache line dirty bit 81, for example, indicates whether cache line 66 is clean or dirty. Thus, cache line dirty bit 81 indicates whether any portion of the cache line 66 contains data that is inconsistent (dirty) with respect to what is stored in system memory. Moreover, each cache line dirty bit 81-87 in the tag array 60 indicates the state of the associated entire cache line, while each sub-line dirty bit 88-94 in the data array 62 indicates the state of just the associated sub-line.

In some embodiments, a logic value of "1" for a dirty bit, be it a cache line or sub-line dirty bit, indicates a dirty state, while a logic value of "0" indicates a clean state. In other embodiments, the logic polarity can be reversed.

FIG. 3 shows a method 100 of responding to a write request using the cache subsystem 54 and managing the dirty bits described above. The cache controller 64 preferably performs one or more, or all, of the actions of method 100. As shown, method 100 starts at 102 upon receiving a write request that hits in the cache subsystem. Determining whether the write request is a cache hit generally involves reading the tags in the tag array 60 as is known to those of ordinary skill in the art.

At 104, method 100 includes determining the state of the cache-line dirty bit associated with the cache line that resulted in the hit. If the state is clean, meaning that the data in that particular cache line has not yet been altered from that in system memory, then at 106, the method includes setting the cache-line dirty bit in the tag array to indicate that the cache line is, or is about to become, dirty as a result of the write transaction. At 108, the method includes updating the cache line in the data array in accordance with the write data in the write request and setting the associated sub-line dirty bits, also in the data array, to reflect the state of the altered sub-lines. In the preferred embodiments, the sub-line dirty bits for just the sub-lines being modified are set. Upon successful completion of block 108, the tag array's cache line dirty bit will be set to indicate the cache line is now dirty and each sub-line that has been updated will have its associated sub-line dirty bit set as well to indicate a change to that sub-line. The actions depicted in FIG. 3 can be performed in an order different from that shown and, if desired, some actions can be performed concurrently.

FIG. 4 shows a method 120 of evicting a cache line to make room for new data in the cache. The cache controller 64 preferably performs one or more, or all, of the actions of method 120. At 122, the method comprises determining a cache line to evict. This action can be performed in accordance with any suitable eviction protocol, such as the least recently used ("LRU") eviction protocol. At 124, the method comprises reading the tag array's cache-line dirty bit associated with the cache line to be evicted.

At 126, the method determines the state of the "to be evicted" cache line based on the associated cache-line dirty bit from the tag array 60. If that bit indicates that the entire cache line was clean (i.e., consistent with system memory), then method 120 stops at 128 in that the cache line, being clean, need not be written back to system memory.

If, however, the cache-line dirty bit indicates that the cache line to be evicted is dirty, then the method comprises, at 130, reading the plurality of sub-line dirty bits from the data array 62. The cache line data preferably is read together with the sub-line dirty bits in a common read operation. This act may require a separate read cycle to read each sub-line dirty thereby requiring, for example, four read cycles in the exemplary embodiment of FIG. 2. For each sub-line dirty bit that is at the dirty state (i.e., "set"), method 120 comprises writing each dirty sub-line in the evicted cache line back to system memory. That is, in accordance with a preferred embodiment, only those sub-lines that are dirty, as indicated by the sub-line dirty bits, are written back to system memory; all clean sub-lines are not written en back to system memory. The actions depicted in FIG. 4 can be performed in an order different from that shown and, if desired, some actions can be performed concurrently.

FIG. 5 shows an exemplary embodiment of a system containing the features described above. The embodiment of FIG. 5 comprises a battery-operated, wireless communication device 415. As shown, the communication device includes an integrated keypad 412 and a display 414. The cache subsystem described above and/or the processor containing the above cache subsystem may be included in an electronics package 410 which may be coupled to keypad 412, display 414 and a radio frequency ("RF") transceiver 416. The RF circuitry 416 preferably is coupled to an antenna 418 to transmit and/or receive wireless communications. In some embodiments, the communication device 415 comprises a cellular telephone.

The above discussion is meant to be illustrative of the principles and various embodiments of the present invention. Numerous variations and modifications will become apparent to those skilled in the art once the above disclosure is fully appreciated. For example, the cache line and sub-line dirty bits described above can be provided in locations other than the tag and data arrays, respectively. For example, the cache line dirty bits need not be in the tag array and, instead, could be in a different storage element. It is intended that the following claims be interpreted to embrace all such variations and modifications.

What is claimed is:

1. A cache system, comprising:
   a tag array into which tags are stored that are used to determine whether a hit or a miss into the cache system has occurred;
   a data array into which cache lines of data are stored, each cache line comprising a plurality of sub-lines, each sub-line adapted to be written back to a system memory separate from the other sub-lines; and
   a controller coupled to the tag and data arrays;
   wherein the tag array includes a cache-line dirty bit associated with each cache line and the data array includes a plurality of dirty bits for each cache line, said plurality of dirty bits comprising one sub-line dirty bit for each sub-line.

2. The cache system of claim 1 wherein, upon receiving a write request that hits on a particular cache line in said cache system, said controller determines a state of the cache-line dirty bit in the tag array that is associated with said particular cache line and, if the state of said cache-line dirty bit is a dirty state, a write of the cache-line dirty bit in the tag array does not occur.

3. The cache system of claim 2 wherein, upon determining that said cache-line dirty bit in the tag array is at a dirty state, said controller writes one or more sub-line dirty bits in the data array to a dirty state, wherein the one or more sub-line dirty bits being so written correspond to those one or more sub-lines whose data is being changed by said write request.

4. The cache system of claim 1 wherein, upon receiving a write request that hits on a particular cache line in said cache system, said controller determines a state of the cache-line dirty bit in the tag array that is associated with said particular cache line and, if the state of said cache-line dirty bit is a clean state, said controller writes the cache-line dirty bit in the tag array to a dirty state.

5. The cache system of claim 4 wherein, upon determining that said cache-line dirty bit in the tag array is at a clean state, said controller also writes one or more sub-line dirty bits in the data array to a dirty state, wherein the one or more sub-line dirty bits being so written correspond to those one or more sub-lines whose data is being changed by said write request.

6. The cache system of claim 1 wherein each cache line comprises four sub-lines and the data array comprises four sub-line dirty bits for each cache line, one sub-line dirty bit associated with each of the four sub-lines in each cache line and wherein the tag array comprises only one cache-line dirty bit associated with each cache line.

7. A system, comprising: logic that performs at least one of instruction fetching, instruction decoding and instruction execution;
   system memory; and a cache subsystem coupled to said logic and to said system memory, said cache subsystem comprising a tag array and a data array;

wherein said data array comprises a plurality of cache lines, each cache line comprising a plurality of sub-lines, and each sub-line adapted to be written to said system memory separate from the other sub-lines; and wherein the tag array includes a cache-line dirty bit associated with each cache line and the data array includes a plurality of dirty bits for each cache line, said plurality of dirty bits comprising one sub-line dirty bit for each sub-line.

8. The system of claim 7 wherein, upon receiving a write request that hits on a particular cache line in said cache subsystem, said cache subsystem determines whether a state of the cache-line dirty bit in the tag array that is associated with said particular cache line and, if said cache-line dirty bit is at a dirty state, a write of the cache-line dirty bit in the tag array does not occur.

9. The system of claim 8 wherein, upon determining that said cache-line dirty bit in the tag array is at a dirty state, said cache subsystem writes one or more sub-line dirty bits in the data array to a dirty state, wherein the one or more sub-line dirty bits being so written correspond to those one or more sub-lines whose data is being changed by said write request.

10. The system of claim 7 wherein, upon receiving a write request that hits on a particular cache line in said cache subsystem, said cache subsystem determines a state of the cache-line dirty bit in the tag array that is associated with said particular cache line and, if the state of said cache-line dirty bit is a clean state, said cache subsystem writes the cache-line dirty bit in the tag array to a dirty state.

11. The system of claim 10 wherein, upon determining that said cache-line dirty bit in the tag array is at a clean state, said cache subsystem also writes one or more sub-line dirty bits in the data array to a dirty state, wherein the one or more sub-line dirty bits being so written correspond to those one or more sub-lines whose data is being changed by said write request.

12. The system of claim 7 wherein each cache line comprises four sub-lines and the data array comprises four sub-line dirty bits for each cache line, one sub-line dirty bit associated with each of the four sub-lines in each cache line and wherein the tag array comprises only one cache-line dirty bit associated with each cache line.

13. The system of claim 7 wherein the system comprises a system selected from a group consisting of a battery-operated communication device and a processor.

14. A cache system, comprising:

a tag array into which tags are stored that are used to determine whether a hit or a miss into the cache system has occurred;

a data array coupled to the tag array and into which cache lines of data are stored, each cache line comprising a plurality of sub-lines, each sub-line adapted to be written back to a system memory separate from the other sub-lines; and a controller operatively coupled to the tag and data arrays;

wherein the tag array includes a cache-line dirty bit associated with each cache line and the data array includes a plurality of dirty bits for each cache line, said plurality of dirty bits comprising one sub-line dirty bit for each sub-line; and wherein, the controller determines a cache line to evict, reads the cache-line dirty bit associated with the cache line to evict and reads each of the plurality of sub-line dirty bits associated with the cache line to evict only if the cache-line dirty indicates that one or more of the sub-lines of the cache line to be evicted is dirty.

15. The cache system of claim 14 wherein, if the cache-line dirty bit associated with the cache line to evict indicates that the associated cache line is dirty, said controller reads each of the sub-line dirty bits and, for each sub-line having a sub-line dirty bit indicating that the sub-line is dirty, said controller writes each such dirty sub-line to system memory.

16. A method associated with a cache comprising a tag array and a data array, said data array comprising a plurality of cache lines, each cache line comprising a plurality of sub-lines and a sub-line dirty bit associated with each sub-line indicative of whether the associate sub-line is clean or dirty, and said tag array comprises a cache-line dirty bit associated with each cache line that indicates whether the associated cache line is clean or dirty, the method comprising:

for a write request that hits into a particular cache line, determining whether the cache-line dirty bit in the tag array that is associated with said particular cache line indicates that said particular cache line is clean or dirty;

if said particular cache line is clean, setting said cache-line dirty bit to a dirty state to indicate that said particular cache line is dirty; and regardless of the state of the cache-line dirty bit, setting one or more sub-line dirty bits in the data array to a dirty state to indicate that said one or more sub-lines are dirty as a result of the write request.

17. The method of claim 16 further comprising, if said cache-line dirty bit indicates that said particular cache line is dirty, not writing said cache-line dirty bit in the tag array.

18. The method of claim 16 further comprising evicting a cache line by determining a state of the cache line and, if the state is clean, then not reading any sub-line dirty bits in the data array, but if the state is dirty, then reading the data array's sub-line dirty bits that are associated with the cache line to be evicted.

19. The method of claim 18 further comprising writing to a system memory just those one or more sub-lines of said cache line to be evicted whose sub-line dirty bit is in a dirty state.

* * * * *